United States Patent [19]
Garcia et al.

[11] 4,451,607
[45] May 29, 1984

[54] POLY(ARYLENE SULFIDE) COMPOSITIONS

[75] Inventors: Rodrigo A. Garcia, Pasadena, Tex.; Robert J. Martinovich, Bartlesville, Okla.

[73] Assignee: Phillips Petroleum Company, Bartlesville, Okla.

[21] Appl. No.: 461,321

[22] Filed: Jan. 27, 1983

[51] Int. Cl.$^3$ ............................................... C08K 3/40
[52] U.S. Cl. .................................. 524/494; 524/505; 524/534; 525/96; 525/92; 525/98; 525/95; 525/537
[58] Field of Search ...................... 525/96, 98, 92, 95, 525/537; 524/494, 505, 534

[56] References Cited
U.S. PATENT DOCUMENTS

| 4,088,626 | 5/1978 | Gergen et al. | 260/42.18 |
| 4,167,507 | 9/1979 | Haaf | 525/92 |
| 4,355,059 | 10/1982 | Blackwell | 525/537 |

OTHER PUBLICATIONS

Derwent Abstract (80584 D/44 J5 6118-456).

Primary Examiner—Melvyn I. Marquis

[57] ABSTRACT

A melt-blended composition comprising poly(arylene sulfide) and hydrogenated conjugated diene/monovinyl aromatic block copolymer with the hydrogenated conjugated diene/monovinyl aromatic block copolymer present in an amount of up to about 5 weight percent of the total composition. A method for increasing the crystallinity of poly(arylene sulfide) by melt-blending therewith hydrogenated conjugated diene/monovinyl aromatic block copolymer in an amount up to about 5 weight percent of the total composition.

19 Claims, No Drawings

POLY(ARYLENE SULFIDE) COMPOSITIONS

BACKGROUND OF THE INVENTION

This invention relates to compositions of matter containing poly(arylene sulfide). In one of its aspects this invention relates to the improvement of processing characteristics of poly(arylene sulfide) compositions. In still another aspect of this invention it relates to poly(arylene sulfide) compositions blended with other polymeric compositions to provide modified crystallinity characteristics for the blended composition. In still another aspect of this invention it relates to poly(arylene sulfide) compositions containing minor amounts of hydrogenated conjugated diene/monovinyl block copolymer.

While reviewing various compositions for use as flow improvers with arylene sulfide polymer compositions, it was discovered that the addition of a minor amount of a hydrogenated butadiene/styrene block copolymer increased the crystallinity of the composition as compared to the polymer without additive and provided a desirable improvement in processing characteristics of arylene sulfide polymers and also provided an improvement in the tendency of the polymer to crack when processed into thick molded shapes. Both the improved processability and the decrease in the tendency to crack provide economic advantages.

It is therefore an object of this invention to provide economically advantageous compositions based on poly(arylene sulfide). It is another object of this invention to provide means for improving the processability of poly(arylene sulfide). It is yet another object of this invention to provide agents suitable for blending with poly(arylene sulfide) thereby providing compositions having physical characteristics improved over compositions otherwise similar except lacking a blended compound.

Other aspects, objects and the various advantages of this invention will become apparent upon reading the specification and the appended claims.

STATEMENT OF THE INVENTION

According to this invention, a melt-blended polymeric composition of poly(arylene sulfide) and a crystallinity increasing amount of hydrogenated conjugated diene/monovinyl aromatic block copolymer is provided.

In an embodiment of the invention a method is provided both for increasing the processability and increasing the crystallinity of a poly(arylene sulfide) composition by melt-blending the composition with a minor amount of hydrogenated conjugated diene/monovinyl aromatic block copolymer. The melt-blend of poly(arylene sulfide) and hydrogenated conjugated diene/monovinyl aromatic block copolymer exhibits improved processability and increased crystallinity over a composition otherwise similar except lacking the conjugated diene/monovinyl aromatic block copolymer.

The poly(arylene sulfide) resins, often abbreviated PAS, contemplated in the compositions of this invention include those described in U.S. Pat. No. 3,354,129 and U.S. Pat. No. 3,919,177. The presently preferred polymer is poly(phenylene sulfide), often abbreviated PPS.

The term poly(arylene sulfide) includes homopolymers and normally solid arylene sulfide copolymers, terpolymers, and the like having melting or softening points of at least 300° F. (149° C.) and more preferably from about 400° F. to about 900° F. (200° C.–482° C.). Other examples of poly(arylene sulfides) are poly(4,4'-biphenylene sulfide); poly(2,4-tolylene sulfide); copolymer of p-dichlorobenzene, 2,4-dichlorotoluene and sodium sulfide and the like. At present, the preferred poly(arylene sulfide) for use in the invention is the poly(phenylene sulfide) that is at least partially cured so that it has a melt flow in the range of about 120±40 grams/10 minutes.

The conjugated diene/monovinyl aromatic block copolymer useful in this invention to modify physical properties in the arylene sulfide compositions includes those described in U.S. Pat. No. 3,595,942, U.S. Pat. No. 3,639,517, and U.S. Pat. No. 4,091,053, which are described as produced by the sequential polymerization of monovinyl-substituted aromatic hydrocarbons and conjugated dienes with the monomer ratio in a range of about 10 to 90 parts by weight conjugated diene to 90 to 10 parts by weight monovinyl aromatic. Multiple additions of initiators and monovinyl-substituted aromatic monomer with subsequent treatment with a polyfunctional treating agent forms resinous branched block copolymers which are polymodal in regard to molecular weight distribution. The polymers useful in this invention are then hydrogenated to provide block copolymers in which at least 80 percent, preferably 85 percent, of the aliphatic double bonds have been hydrogenated while not more than 25 percent of the aromatic double bonds have been hydrogenated. Most preferably about 99 percent of the aliphatic double bonds have been hydrogenated while less than 5 percent of the aromatic double bonds have been hydrogenated. Such hydrogenation is well known in the art in typical hydrogenation procedures as described in U.S. Pat. No. 4,088,626.

The preferred hydrogenated conjugated diene/monovinyl aromatic block copolymers are isoprene/styrene block copolymers or butadiene/styrene block copolymers that can contain up to about 45 percent by weight styrene blocks, preferably frpom about 10 to about 40 percent by weight styrene blocks. These polymers will have a total average molecular weight typically on the order of about 25,000 to about 350,000, preferably from about 35,000 to about 300,000. The invention will be illustrated below using butadiene/styrene block copolymer, but is also particularly effective using isoprene/styrene block copolymer probably because of the similarity in characteristics of these two conjugated dienes particularly in copolymerized interaction with styrene.

While the desirable effects of blending hydrogenated conjugated diene/monovinyl aromatic block copolymer with poly(arylene sulfide) will be exhibited in blends containing any amount of the hydrogenated conjugated diene/monovinyl aromatic block copolymer up to about 5 percent by weight, the preferred range of copolymer additive is about 1 to about 5 percent by weight.

Mineral fillers and glass fillers can be present in the compositions of this invention in a total amount of up to about 65 weight percent of the total composition, preferably in a range of about 30 to about 60 weight percent of the total composition. Mineral fillers useful in this invention can be chosen from those materials such as calcium carbonate, calcium sulfate, talc, mica, and the like, while the glass materials can be chosen from any of those products commercially available which generally find use as fillers and reinforcing agents in polymeric blends. These can be chosen from fiberglass or glass beads, for instance, with the preferred material for this invention being glass fiber.

As is usual in polymeric blends based on poly(arylene sulfide) a variety of other additives can be used in minor amounts of up to about 3 percent by weight of the total composition. These additives include such materials as flow improving (processability) agents, silanes, and pigments. Compatible processability agents can be selected from among solid ethylene copolymers (see U.S. Pat. No. 4,134,874), saturated fatty acid salts such as zinc stearate, and the N,N'-alkylene bis(alkanamides), glycerides and phosphated glycerides of saturated fatty acids containing from 10 to 30 carbon atoms, mono- and dialkanolamides derived from saturated fatty acids and esters derived from a saturated long-chain fatty acid and long-chain saturated aliphatic alcohol. General fillers such as lithium carbonate are also suitable as processability agents.

The mode of mixing or blending compositions useful in the present process include the conventional processes as known in the art. Particularly useful is dry blending using commercial apparatus followed by a melt-blending operation of extrusion and pelleting using commercial apparatus. A dry-blending of the copolymer with the poly(arylene sulfide) without further working of the composition is not sufficient to obtain the benefits of this invention. A melt-blending process is required. The presence of the copolymer while the composition is in a melted state in the melt-blending process is believed to cause an increase in crystallinity of the composition upon recrystallization. The combination of dry-blending followed by melt-blending facilitates the mixing of the composition.

The examples following should be taken as exemplary and not exclusive in illustrating the invention.

EXAMPLE

This example describes the procedures used to compound and evaluate compositions described in this invention. A mixture of 95 weight percent Ryton R-4 (which is a composition, trademarked by Phillips Petroleum Co., of 60 weight polyphenylene sulfide, flow rate 120±20 grams per 10 minutes as determined by the test method ASTM D 1238, Procedure B, plus 40 weight percent fiberglass) and 5 weight percent hydrogenated 70 parts by weight butadiene/30 parts by weight styrene block copolymer ($M_w$ 50,000, 37 weight percent vinyl unsaturation before hydrogenation) were dry blended in a fiber drum and extruded through a 1.5 inch Johnson Extruder, 24:10 L/D, barrel temperature 600° F. The extrudant was air cooled and granulated in a chopper into particles about 0.10 to 0.25 inch diameter size. Two tests were then made on these particles, namely, cracking test and degree of crystallization as determined by Differential Thermal Analysis.

Cracking Test—The granulated particles were molded into discs using a New Britain molding machine, Model 75B, injection pressure 1000 psig, barrel temperature 600° F., injection molded into single cavity disc molds, 0.5 inch thick×2.5 inches diameter being center-gated on one face. The mold temperature was 100° F. The samples were cooled outside the mold to about 25° C. for 2 hours. Eighteen such discs were prepared and divided into 3 groups. The first group contained 2 discs. One disc was annealed at 400° F. for 2 hours while the other disc was retained without further treatment. This group was merely used as a standard from which other treated discs could be compared relative to defects, surface conditions, etc.

The second group contained 8 discs which were sawed in half parallel to the face of the disc. The non-sprue half was annealed at 400° F. for 2 hours, cooled to about 25° C. for 24 hours and examined for cracks. The third group contained 8 discs which were annealed first at 400° F. for 2 hours, cooled to 25° C. for 24 hours and then sawed in half, examining the non-sprue half for cracks. Eleven of the sixteen samples exhibited some type of cracking although the cracks were very minor. Five of the discs exhibited no cracks.

Degree of Crystallation—The granulated particles first prepared were again molded but this time into bars approximately 5.0 inches×0.50 inch×0.25 inch at three mold temperatures, 100° F., 150° F., 200° F. An Arburg Allrounder molding machine, Model 221E/221 was employed, with nozzle and front zone temperature 650° F., middle and rear zone temperature 600° F., cycle time 31 seconds. To test for the relative degree of crystallization a small, solid molded piece (about 35 milligrams) was placed in a DuPont Differential Thermal Analyzer, Model 900 containing a Differential Scanning Calorimeter cell and slowly heated at 10° C. per minute from room temperature to about the melt temperature of the sample (i.e. 300° C.) while being monitored and recorded on a moving chart. In this test when non- or incompletely crystalline PPS reaches about 127° C. an exotherm peak appears on the chart. This peak is referred to as the crystallinity peak. At about 277° C. an endotherm peak appears. This latter peak indicates the crystalline melting point of the sample. The relative ratio of the height of the crystallinity peak to the height of the melting point peak of any two samples is a relative measure of the degree of crystallinity in the two samples before testing. The sample having the greater ratio has the lower crystallinity.

The PPS composition containing 5 weight percent hydrogenated butadiene/styrene copolymer was molded at these different mold temperatures. A ratio of 1.14 was calculated for the sample obtained from the 100° F. molding. A 150° F. mold temperature sample gave a ratio of 0.39 indicating more crystallation. A 200° F. mold temperature sample gave a ratio of 0.34 indicating still greater crystallization.

The procedures described were repeated using a composition containing only 1 weight hydrogenated butadiene/styrene copolymer. A control was also made where no copolymer was present. These results are listed in Table I which shows that the presence of 1 to 5 weight percent of a hydrogenated butadiene/styrene block copolymer in a glass-filled PPS composition gives a product of higher crystallinity when extruded into molds maintained at 150° F. and 200° F. Extrusion into a mold at 100° F. does not give the degree of crystallinity desired. These data show that higher crystallinity can be achieved with the inventive compositions when using a mold maintained at 150° F. to 200° F. than can be achieved with the control. The data also indicates some improvement in cracking is obtained with the inventive composition.

TABLE I

Effect of Copolymer on Crystallinity of PPS-Based Compositions

| Performance Tests | PPS[a] + Hydrogenated Bd/S Copolymer[b] | | |
|---|---|---|---|
|  | 0% Co-polymer | 1% Co-polymer | 5% Co-polymer |
| 1. Crystallization Peak:Melting Point Ratio |  |  |  |
|     Mold Temp., 100° F. | 1.86 | 1.93 | 1.14 |
|     150° F. | 1.90 | 0.73 | 0.39 |
|     200° F. | 0.51 | 0.24 | 0.34 |
| 2. Cracking[c], No. of discs with cracks over no. of discs tested | 16/16 severe | 16/16 less severe | 11/16 even less severe cracking |

[a] Ryton R-4, 60% PPS + 40% glass fibers.
[b] Hydrogenated 70 pts. butadiene/30 pts. styrene block copolymer coupled with dimethyldichlorosilane, $M_w$ 50,000 ± 5,000, 37% original vinyl unsaturation.
[c] Discs, 2.5 in. diameter × 0.5 in. thick, annealed at 400° F./2 hrs.

We claim:

1. A melt-blending composition comprising poly(arylene sulfide) and hydrogenated conjugated diene/monovinyl aromatic block copolymer which has been produced by sequential polymerization of about 10 to about 90 parts by weight conjugated diene with about 90 to about 10 parts by weight monovinyl substituted aromatic hydrocarbon and subsequent hydrogenation of at least 80 percent of the aliphatic double bonds while not more than 25 percent of the aromatic double bonds have been hydrogenated said hydrogenated conjugated diene/monovinyl aromatic block copolymer present in an amount of up to about 5 percent by weight of the total composition.

2. A composition of claim 1 wherein said hydrogenated conjugated diene/monovinyl aromatic block copolymer is present in an amount in a range of about 1 to about 5 weight percent.

3. A composition of claim 1 wherein filler comprises up to about 65 percent by weight of the total composition.

4. A composition of claim 3 wherein the said filler is fiberglass.

5. A composition of claim 1 wherein said poly(arylene sulfide) is poly(phenylene sulfide) and said conjugated diene of said hydrogenated conjugated diene/monovinyl aromatic block copolymer is chosen from butadiene and isoprene.

6. A composition of claim 2 wherein said poly(arylene sulfide) is poly(phenylene sulfide) and said conjugated diene of said hydrogenated conjugated diene/monovinyl aromatic block copolymer is chosen from butadiene and isoprene.

7. A composition of claim 4 wherein said poly(arylene sulfide) is poly(phenylene sulfide) and said conjugated diene of said hydrogenated conjugated diene/monovinyl aromatic block copolymer is chosen from butadiene and isoprene.

8. A composition of claim 5 wherein said hydrogenated conjugated diene/monovinyl aromatic block copolymer is a hydrogenated butadiene/styrene block copolymer.

9. A composition of claim 6 wherein said hydrogenated conjugated diene/monovinyl aromatic block copolymer is a hydrogenated butadiene/styrene block copolymer.

10. A composition of claim 7 wherein said hydrogenated conjugated diene/monovinyl aromatic block copolymer is a hydrogenated butadiene/styrene block copolymer.

11. A method for increasing the crystallinity of poly(arylene sulfide) comprising melt-blending therewith a crystallinity increasing amount of hydrogenated conjugated diene/monovinyl aromatic block copolymer said amount being in a range of up to about 5 weight percent of the total composition said block copolymer having been produced by sequential polymerization of about 10 to about 90 parts by weight conjugated diene with about 90 to about 10 parts by weight monovinyl substituted aromatic hydrocarbon and subsequent hydrogenation of at least 80 percent of the aliphatic double bonds while not more than 25 percent of the aromatic double bonds have been hydrogenated.

12. A method of claim 11 wherein said amount of hydrogenated conjugated diene/monovinyl aromatic block copolymer is in a range of about 1 to about 5 percent by weight of the total composition.

13. A method of claim 11 wherein said composition contains up to about 65 percent by weight of filler.

14. A method of claim 13 wherein said filler is fiberglass.

15. A method of claim 12 wherein said composition contains up to about 65 percent by weight of the total composition of filler.

16. A method of claim 14 wherein said filler is fiberglass.

17. A method of claim 11 wherein said poly(arylene sulfide) is poly(phenylene sulfide) and said conjugated diene of said hydrogenated conjugated diene/monovinyl aromatic block copolymer is chosen from butadiene and isoprene.

18. A method of claim 12 wherein said poly(arylene sulfide) is poly(phenylene sulfide) and said conjugated diene of said hydrogenated conjugated diene/monovinyl aromatic block copolymer is chosen from butadiene and isoprene.

19. A method of claim 13 wherein said poly(arylene sulfide) is poly(phenylene sulfide) and said conjugated diene of said hydrogenated conjugated diene/monovinyl aromatic block copolymer is chosen from butadiene and isoprene.

* * * * *